United States Patent
Yoon et al.

(10) Patent No.: US 6,931,171 B2
(45) Date of Patent: *Aug. 16, 2005

(54) MICROMIRROR ACTUATOR AND MANUFACTURING METHOD THEREOF

(75) Inventors: Yong-seop Yoon, Seoul (KR); Hyung Choi, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 119 days.

This patent is subject to a terminal disclaimer.

(21) Appl. No.: 10/310,134

(22) Filed: Dec. 5, 2002

(65) Prior Publication Data

US 2003/0118278 A1 Jun. 26, 2003

(30) Foreign Application Priority Data

Dec. 15, 2001 (KR) ......................................... 2001-79723

(51) Int. Cl.[7] ............................................... G02B 6/26
(52) U.S. Cl. .......................... 385/18; 385/16; 359/291
(58) Field of Search ..................... 385/16–24; 359/223, 359/224, 290–292, 295; 257/415

(56) References Cited

U.S. PATENT DOCUMENTS 6,760,143 B2 * 7/2004 Yoon ........................... 359/290

* cited by examiner

Primary Examiner—Phan T. H. Palmer
(74) Attorney, Agent, or Firm—Sughrue Mion, PLLC

(57) ABSTRACT

An actuator which can be actively driven so as to precisely control a driving angle of a micromirror, and a manufacturing method thereof are provided. The micromirror actuator includes a substrate, a trench, a micromirror, and a driving angle control unit. The trench is formed in a predetermined position of the substrate and has at least one electrode. The micromirror rotates by an electrostatic force generated through an interaction with the at least one electrode so as to reflect incident light in a predetermined direction. The driving angle control unit supports the micromirror so as to control the position of an actuation shaft of the micromirror. Accordingly, the micromirror can stand erect at an accurate right angle without an additional actuator for correcting the error in the driving angle of the micromirror so as to reduce insertion loss.

16 Claims, 18 Drawing Sheets

MICROMIRROR ACTUATOR AND MANUFACTURING METHOD THEREOF

BACKGROUND OF THE INVENTION

This application claims the priority of Korean Patent Application No. 2001-79723, filed Dec. 15, 2001, in the Korean Intellectual Property Office, the disclosure of which is incorporated herein in its entirety by reference.

1. Field of the Invention

The present invention relates to a micromirror actuator and a manufacturing method thereof, and more particularly, to an actuator which can actively be driven so as to precisely control driving angle of a micromirror, and a manufacturing method thereof.

2. Description of the Related Art

In general, optical switches select an optical path to allow an optical signal to be transmitted from a predetermined input port to a predetermined output port. Referring to FIG. 1, a plurality of micromirror actuators 10 are arranged in the form of two-dimensional matrix. Light beams emitted from optical fibers 43 of an input portion are changed to collimated light beams via micro lenses 45. The collimated light beams are incident and reflected on corresponding micromirrors 31a–31d that stand erect, and then transmitted to optical fibers 48 of an output portion via micro lenses 46. In other words, an optical switch selects optical paths so that incident optical signals are reflected on micromirrors 31a, 31b, 31c, and 31d that stand erect over a substrate 15 while they pass over micromirrors 32 that are parallel with the surface of the substrate 15. For example, a micromirror 31a in the fourth row of the first column, a micromirror 31b in the third row of the second column, a micromirror 31c in the first row of the third column, and a micromirror in the second row of the fourth column stand erect to be perpendicular to the substrate 15, and the other micromirrors are parallel with the surface of the substrate 15 so that the optical signals are transmitted to desired optical paths.

FIG. 2 shows a conventional micromirror actuator 10 using an electrostatic force. A trench 5 is formed in a substrate 15. Supporting posts 20 stand erect beside both sidewalls of the trench 5. The supporting posts 20 support torsion bars 25 with which a micromirror 30 is joined to be capable of rotating. The micromirror 30 is composed of an actuator 30a that faces the trench 5 using the torsion bars 25 as shafts when the micromirror 30 is parallel with the surface of the substrate 15, and a reflector 30b.

FIG. 3 is a cross-sectional view taken along ling II—II of FIG. 2. A lower electrode 37 is formed at the bottom of the trench 5, and a side electrode 40 is formed on one sidewall of the trench 5 so as to drive the micromirror 30 by electrostatic forces generated through interaction with the actuator 30a. In other words, an electrostatic force operates between the lower electrode 37 and the actuator 30a so that the micromirror 30 rotates downward. After the micromirror 30 rotates to some extent, an electrostatic force operates between the actuator 30a and the side electrode 40 so that the micromirror 30 sequentially rotates and stands erect. The micromirror 30 is elastically supported by the torsion bars 25 to be capable of rotating. After the electrostatic forces are released, the micromirror 30 is restored to its parallel state by a restoring force of the torsion bars 25.

The side electrode 40 generates an electrostatic force through an electrical interaction with the micromirror 30 and serves as a stopper that supports the micromirror 30 so as to maintain its accurate right angle when standing erect. For the side electrode 40 serving as the stopper, the torsion bars 25, which are a rotation shaft of the micromirror 30, have to be correspondingly positioned on a plane which extends to include the side electrode 40. In a case where the torsion bars 25 are positioned outside the plane including the side electrode 40, the micromirror 30 cannot stand erect. FIG. 4A shows the torsion bars 25 that are positioned outside the sidewall of the trench 5 where a driving angle $\theta_1$ of the micromirror 30 is smaller than 90°. FIG. 4B shows the torsion bars 25 that are positioned inside the sidewall of the trench 5 where a driving angle $\theta_2$ of the micromirror 30 is greater than 90°.

The torsion bars 25 and the sidewall of the trench 5 have to be positioned accurately on the same level so that the micromirror 30 stands erect at an angle of 90°. However, a relative position difference between the torsion bars 25 and the sidewall of the trench 25 due to manufacturing tolerance of an actuator of the micromirror 30, differences in a right-angle degree of the sidewall of the trench 5 and planarity of the micromirror 30, and the like causes inevitable deviation. Although an error in such a manufacturing process is slight, the error affects insertion loss that is a very important element in an actuator for an optical switch. Accordingly, after the manufacture of the micromirror actuator is completed, it is required to correct a relative position difference between the torsion bars and the sidewall of the trench occurring due to the error of the manufacturing process.

SUMMARY OF THE INVENTION

To solve the above-described problems, it is an object of the present invention to provide a micromirror actuator which can be actively actuated so as to precisely control a driving angle of a micromirror, and a manufacturing method thereof.

Accordingly, to achieve the above object, there is provided a micromirror actuator including a substrate, a trench which is formed in a predetermined position of the substrate and has at least one or more electrodes, a micromirror which rotates by an electrostatic force generated through an interaction with the at least one or more electrodes so as to reflect incident light in a predetermined direction, and a driving angle control unit which supports the micromirror so as to control the position of an actuation shaft of the micromirror.

The driving angle control unit includes first posts which stand erect over two portions of the surface of the substrate beside sidewalls of the trench, plates which are rotatably supported by first torsion bars that are coupled to the first posts, respectively, and a pair of base electrodes which are prepared on the substrate so as to face the plates when the plates are parallel with the surface of the substrate.

The micromirror is rotatably supported by second torsion bars which are coupled to second posts fixed to the plates.

The plates are placed on two portions of the surface of the substrate beside the trench.

The plates are supported by the first posts in the form of cantilever.

The plates form a single body so as to cross under the micromirror.

The plate of the single body has a recessing portion so as not to contact the micromirror when the micromirror rotates.

The at least one or more electrodes include lower and side electrodes which are installed at the bottom and sidewall of the trench, respectively.

The micromirror actuator further includes a shielding electrode for shielding an electrostatic force from being generated over the substrate that faces the micromirror when the micromirror is parallel with the surface of the substrate.

To achieve the above object, there is provided a method of manufacturing a micromirror actuator. A wafer is coated with photoresist, a trench region is patterned, and a trench is formed using an etching process. A first metal layer is deposited on the wafer including the trench, lower and side electrodes are formed at the bottom and sidewall of the trench using an etching process, and a base electrode is formed outside the trench. A film-type organic layer is stacked on the resultant structure and the organic layer is laminated by applying heat and pressure. The organic layer is etched to form holes for first holes. A second metal layer is deposited on the resultant structure, and first posts, first torsion bars, and plates are formed using an etching process. The second metal layer is coated with photoresist and the photoresist is etched to form holes for second posts. A third metal layer is deposited on the photoresist, second posts, second torsion bars, and micromirror are patterned using an etching process, and the photoresist and the organic layer are removed.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE INVENTION

Figure 1:
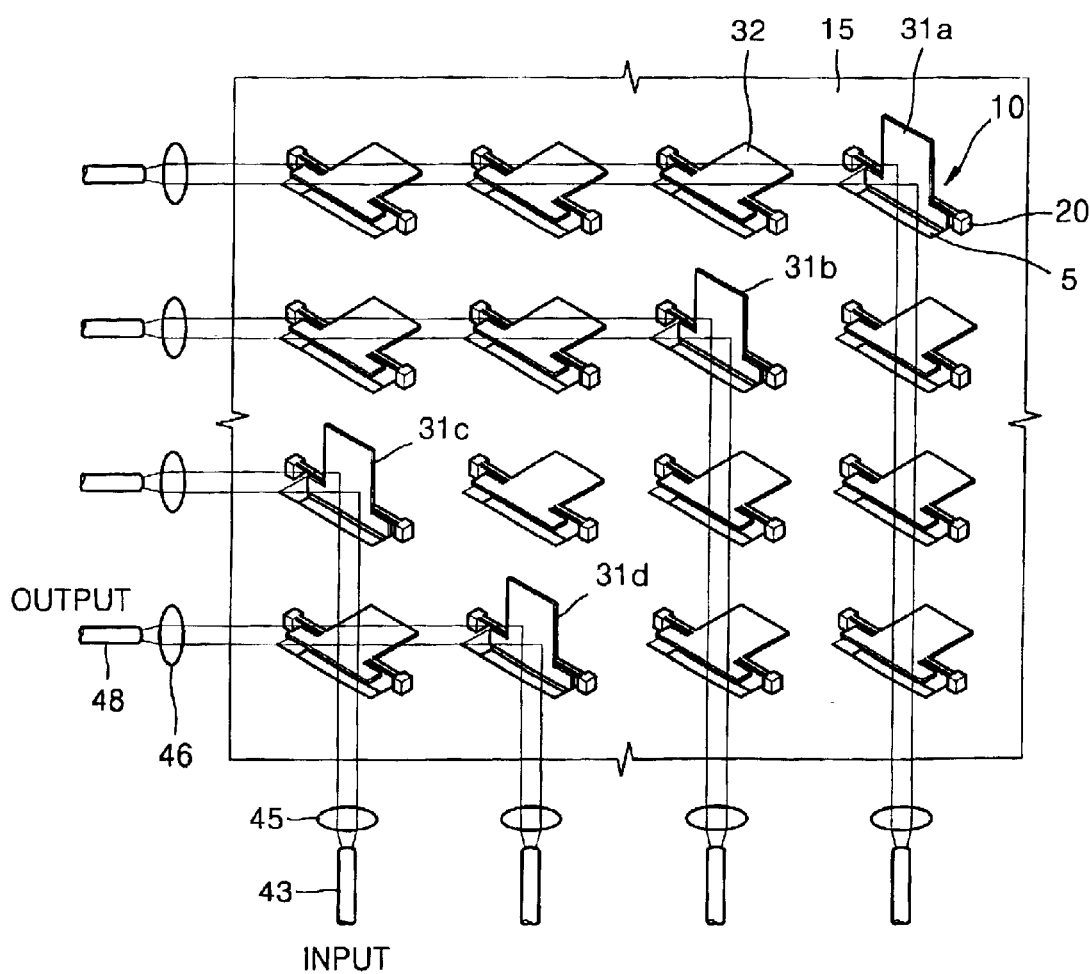
FIG. 1 is a view of a plurality of micromirrors which are arranged in the form of matrix.
Figure 2:
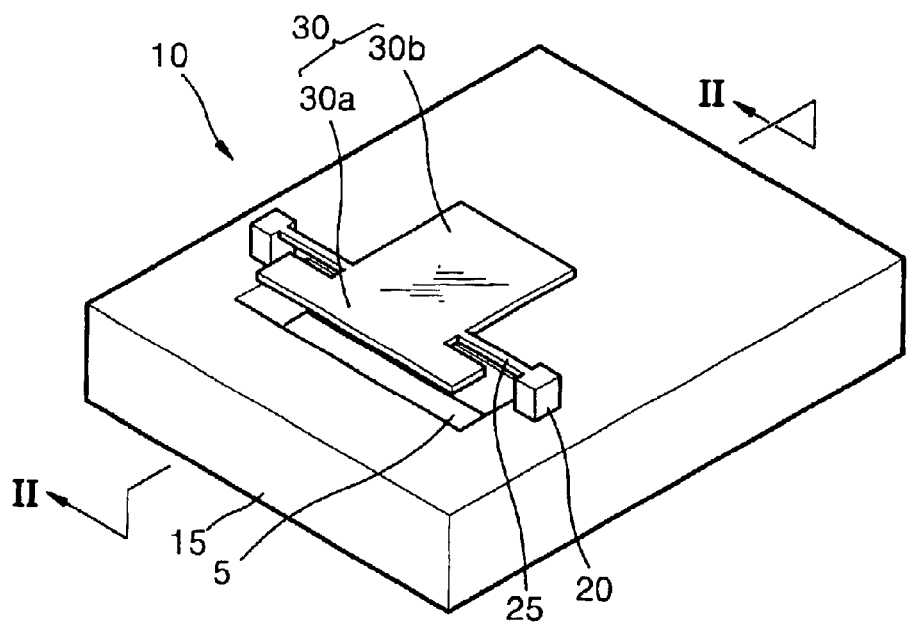
FIG. 2 is a perspective view of a conventional micromirror actuator.
Figure 3:
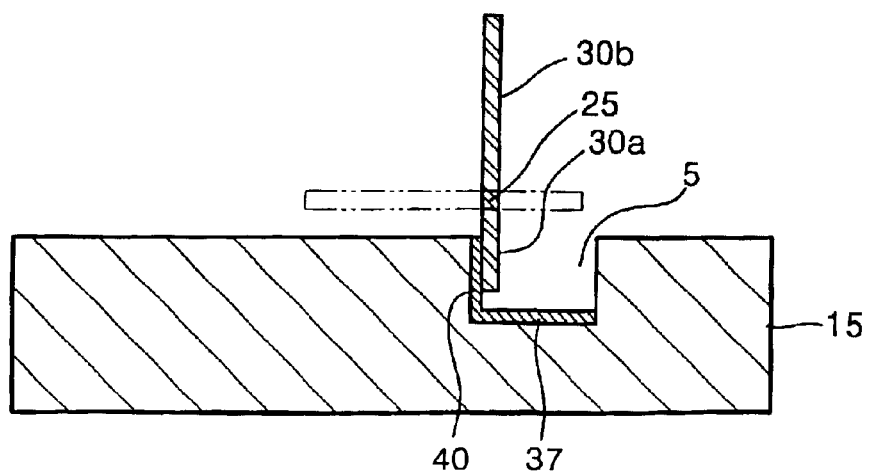
FIG. 3 is a cross-sectional view taken along line II—II of FIG. 2.
Figure 4A:
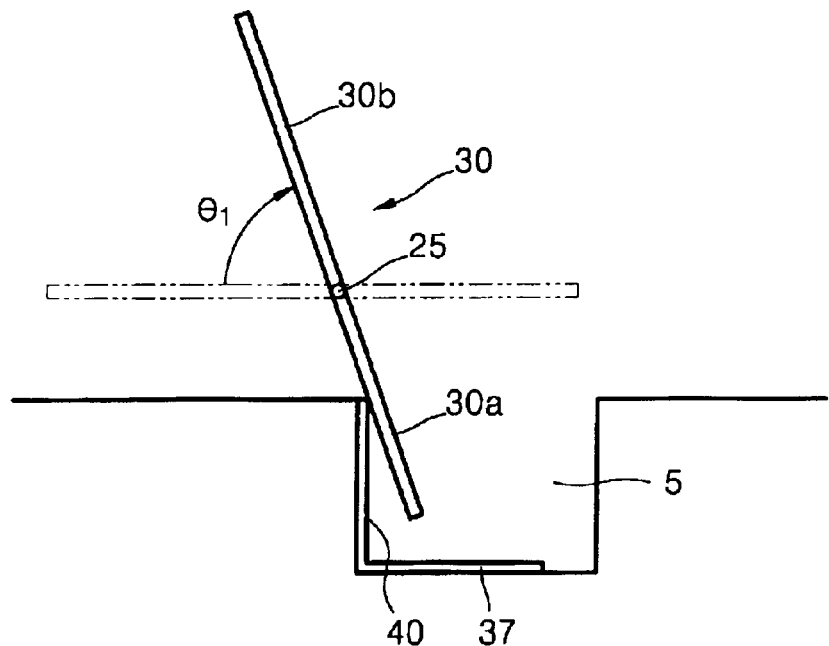
FIGS. 4A and 4B show the case where a micromirror does not correspond to a sidewall of a trench in a conventional micromirror actuator, respectively.
Figure 4B:
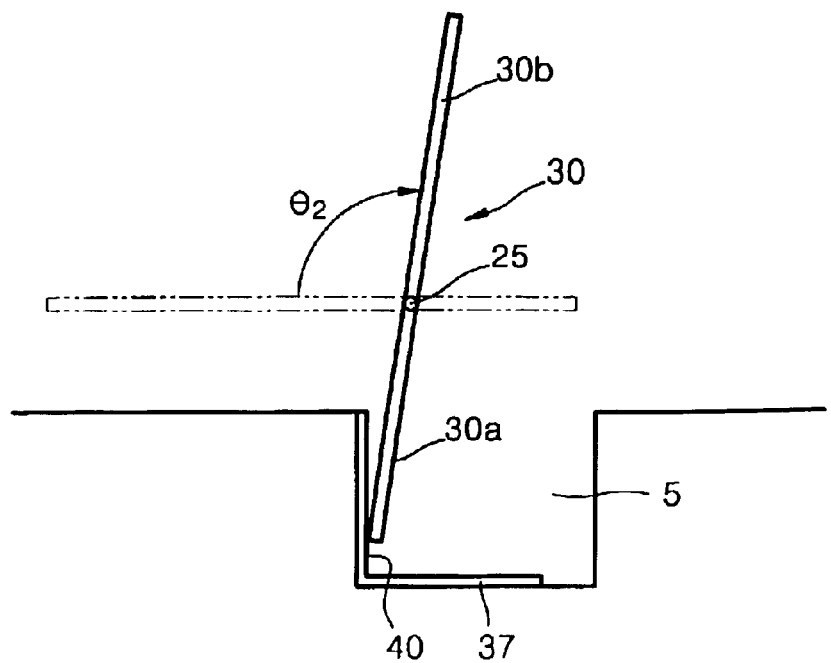
Figure 5:
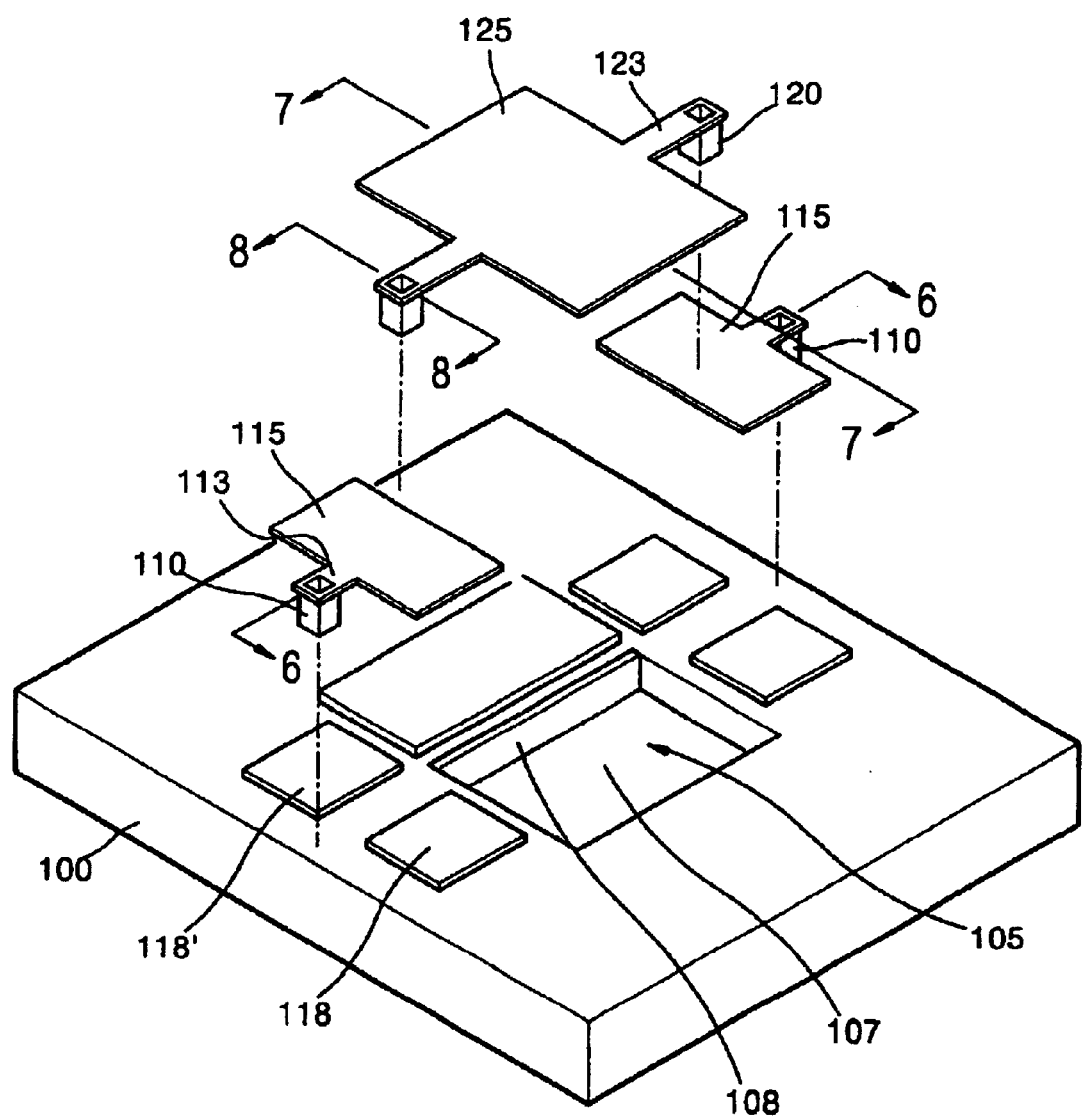
FIG. 5 is an exploded perspective view of a micromirror actuator according to a preferred embodiment of the present invention.
Figure 6:
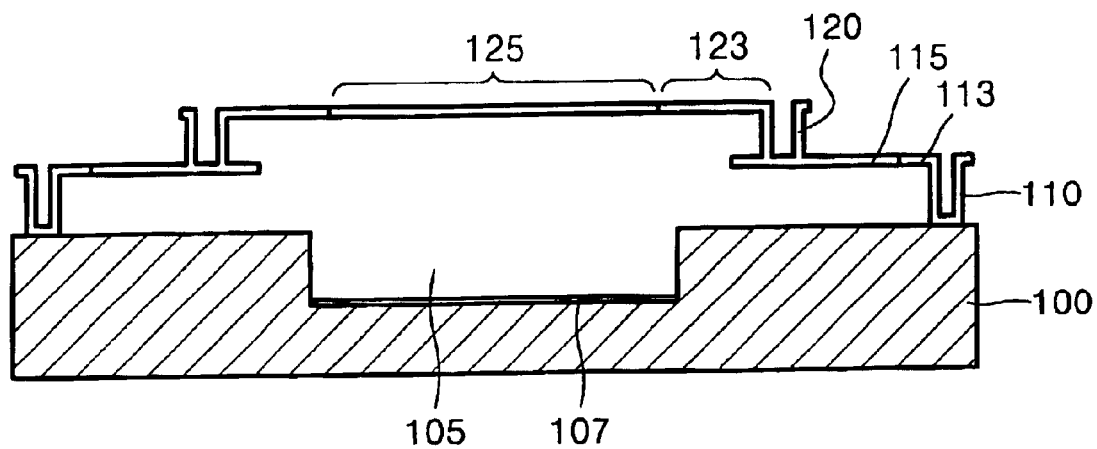
FIG. 6 is a cross-sectional view taken along line 6—6 of FIG. 5.

Referring to FIGS. 5 and 6, in a micromirror actuator according to the present invention, a trench 105 having at least one or more electrodes is formed in a predetermined position of a substrate 100. A micromirror 125 is disposed over the trench 105 so as to face at least one or more electrodes. The micromirror 125 rotates with respect to a rotation shaft by an electrostatic force generated between the micromirror 125 and the at least one or more electrodes so as to reflect incident light. In particular, in the present invention, a driving angle control unit supporting the micromirror 125 is included to control the position of the rotation shaft of the micromirror 125.

In the driving angle control unit, first posts 110 stand on portions of a substrate 100 beside both sidewalls of the trench 105. First torsion bars 113 are connected to the first posts 110. Plates 115 are elastically rotatably supported by the first torsion bars 113. Second posts 120 stand on the plates 115. The micromirror 125 is elastically rotatably supported by second torsion bars 123 which are connected to the second posts 120. The micromirror 125 rotates using the second torsion bars 123 as a rotation shaft. The driving angle control unit having the above-described structure can precisely control the positions of the second torsion bars 123.

Figure 8:
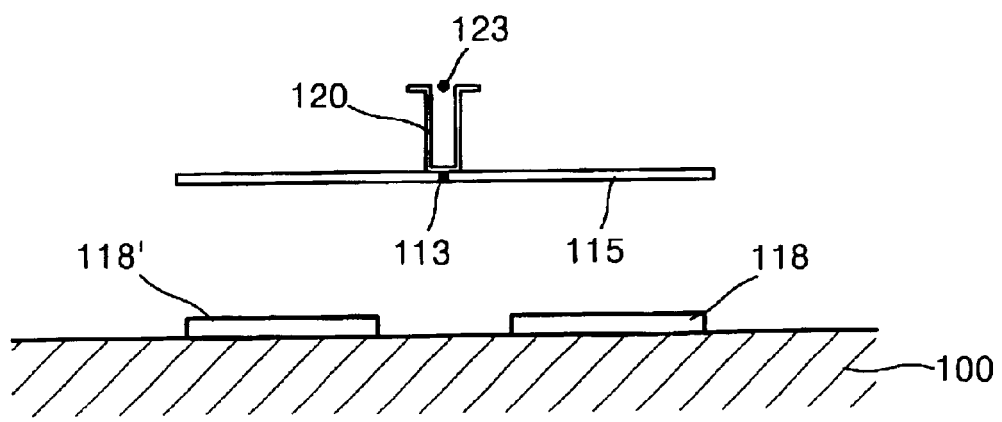
FIG. 8 is a cross-sectional view taken along line 8—8 of FIG. 5.

Here, the plates 115 and the micromirror 125 form a bilayer structure so as to be positioned on different plans. FIG. 8 is a cross-sectional view taken along line 8—8 of FIG. 5. A pair of first and second base electrodes 118 and 118', which actuate the plate 115 by an electrostatic force generated through interaction with the plate 115, are included. The first and second base electrodes 118 and 118' face the plate 115 when the plate 115 is parallel with the surface of the substrate 100 and are symmetrical about the first torsion bar 113.

Figure 7:
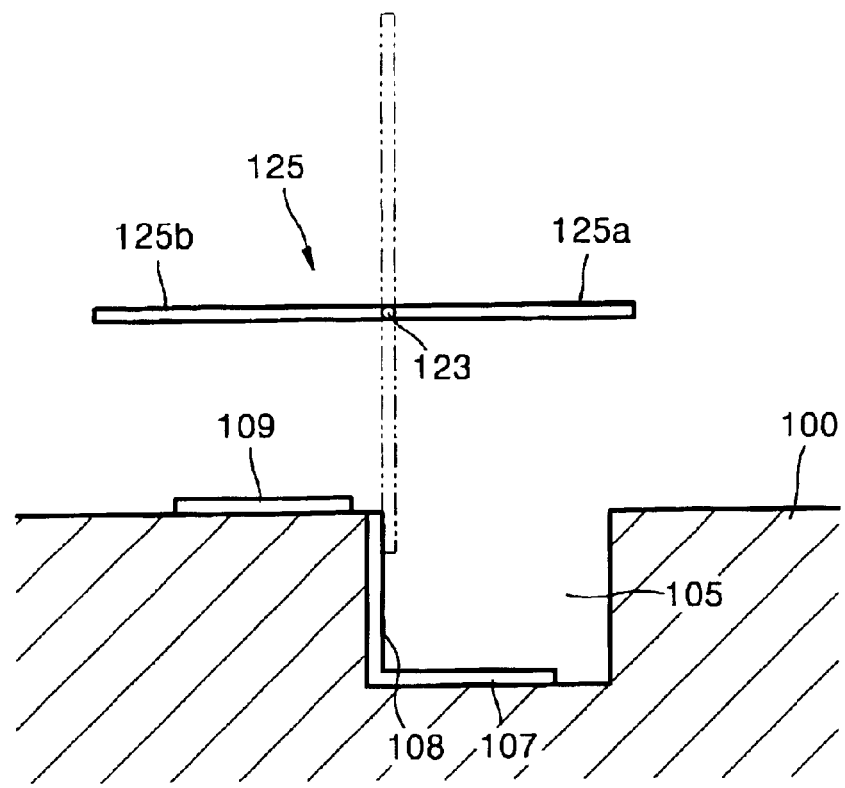
FIG. 7 is a cross-sectional view taken along line 7—7 of FIG. 5.

Also, as shown in FIG. 7, a lower electrode 107 and a side electrode 108 are formed at the bottom and a sidewall of the trench 105 so as to generate electrostatic forces through an interaction with the micromirror 125. The micromirror 125 is elastically actuated by the electrostatic forces with respect to the torsion bar 123 as a rotation shaft. The micromirror 125 includes an actuator portion 125a which faces the trench 105 when the micromirror 125 is parallel with the surface of the substrate 100, and reflector portion 125b on which incident light is reflected when the micromirror 125 stands erect. Here, a shielding electrode 109, which is opposite to the reflector 125b when the micromirror 125 is parallel with the surface of the substrate 100, is further prepared on the substrate 100. The shielding electrode 109 shields the generation of an electrostatic force that is opposite to electrostatic forces generated between the actuator portion 125a and the lower electrode 107 and between the actuator portion 125a and the side electrode 108.

Figure 9:
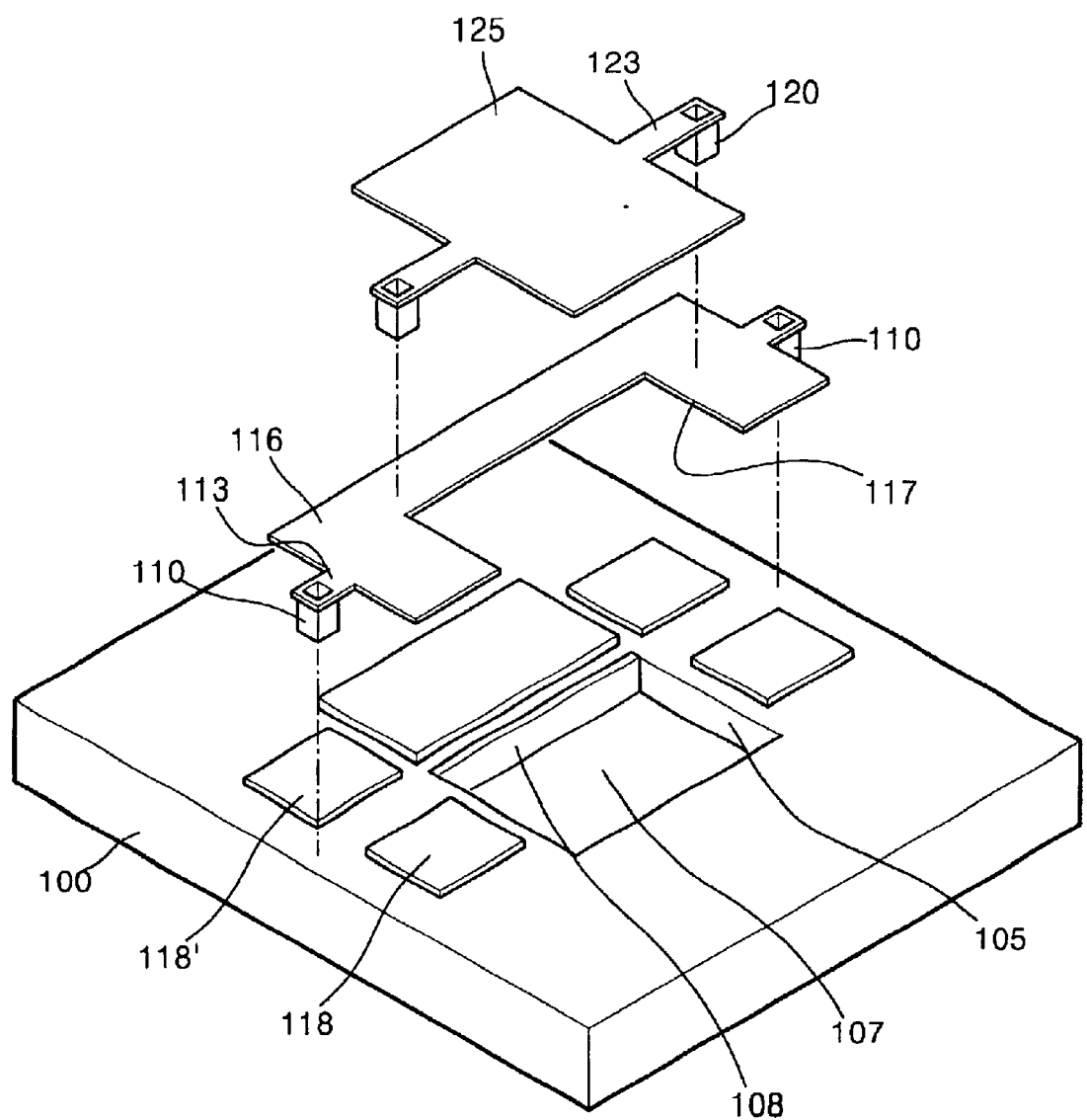
FIG. 9 is an exploded perspective view of a micromirror actuator according to another embodiment of the present invention.

In FIG. 5, there are two plates 115 respectively disposed on two portions of the substrate 100 beside both sidewalls of the trench 105. In this case, first ends of the plates 115 are supported by the first posts 110 and the first torsion bars 113 in the form of cantilever. However, in FIG. 9, a plate 116 has a single body so as to cross under the micromirror 125. Also, both ends of the plate 116 are supported by the first posts 110 so as to have more stable structure. Here, elements that have the same functions and operations as elements shown in FIG. 5 have the same reference numerals. The plate 116 has a recession 117 so as not to contact the micromirror 125 when the micromirror 12 rotates.

The operation of the micromirror actuator having the above-described structure will be described.

Referring to FIG. 6, the micromirror 125, the second torsion bars 123, the second posts 120, the plates 115, the first torsion bars 113, and the first posts 115 are formed of a metal material to transmit electricity. Thus, when a predetermined reference voltage is applied by a driving source (not shown) prepared in the substrate 100, an equipotential is formed from the first posts 110 to the micromirror 125. When a voltage higher or lower than the reference voltage is applied to the lower electrode 107 and the side electrode 108, electrostatic forces, operate between the micromirror 125 and the lower and side electrodes 107 and 108. Thus, the micromirror 125 is pulled toward the lower and side electrodes 107 and 108 and rotates using the second torsion bars 123 as the rotation shaft. As a result, the micromirror 125 sticks to the side electrode 108 and stands erect.

Here, the shielding electrode 109 is positioned in a pathway where an electrostatic force may be generated between the reflector portion 125b and the lower electrode 107 or the side electrode 108. Thus, the shielding electrode 109 shields the electrostatic force from being generated between the reflector 125b and the lower electrode 107 or the side electrode 108. In a case where the shielding electrode 109 does not exist, electrostatic forces may generated between the actuator 125a and the lower and side electrodes 107 and 108 and between the reflector 125b and the lower and side electrodes 107 and 108 when the an electrostatic force is generated between the micromirror 125 and the lower and side electrodes 107 and 108. However, the electrostatic force between the reflector 125b and the lower and side electrodes 107 and 108 operates in an opposite direction to the electrostatic force between the actuator 125a and the lower and side electrodes 107 and 108, thus reducing the actuating force of the actuator 125a. Thus, it is preferable that the shielding electrode 109 is prepared in the pathway between the reflector 125b and the lower and side electrodes 107 and 108 to shield the electrostatic force from being generated through an interaction between the reflector 125b and the side electrode 108 or the lower electrode 107.

Figure 10A:
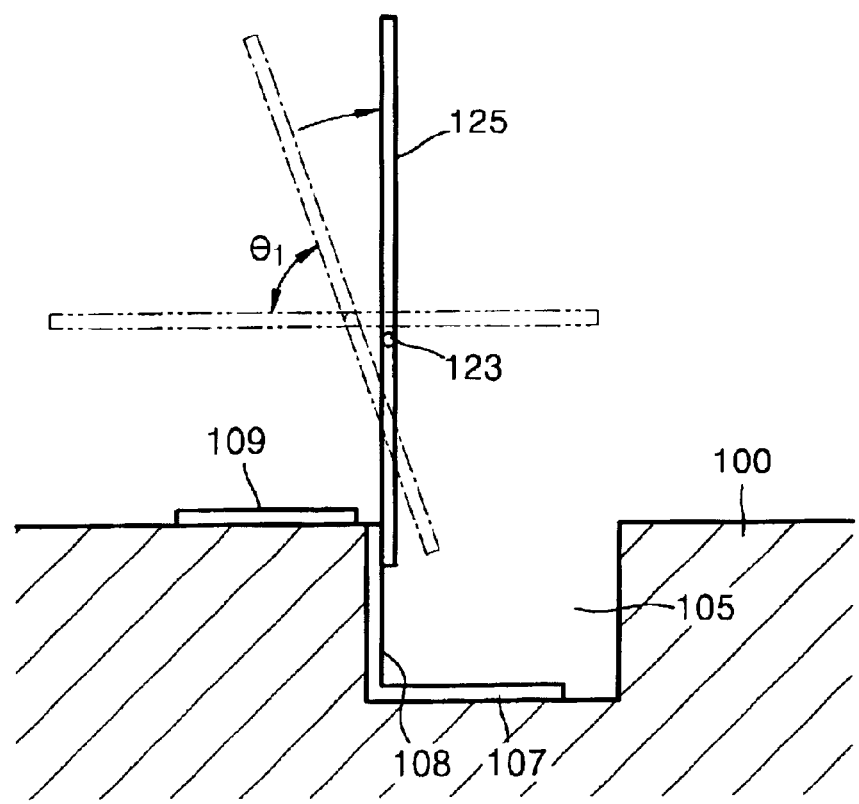
FIGS. 10A, 10B, 11A, and 11B are views explaining the correction of the position of a micromirror by the micromirror actuator according to the present invention.

The micromirror 125 is rotated by the above-described process and supported by the sidewall of the trench 105 so as to stand erect. However, the micromirror 125 may not stand erect at an accurate right angle due to the previously-described manufacturing process error. In detail, the sidewall of the trench 105, on which the side electrode 108 is positioned, and the second bars 123, which are the rotation shaft of the micromirror 125, have to be on the same level so that the micromirror 125 stands erect at the accurate right angle. In other words, the second torsion bars 123 have to be positioned accurately on the level which is formed by extending the sidewall of the trench 105 upwardly. However, in a case where the second torsion bars 123, which are the rotation shaft of the micromirror 125, are slanted to the outside of the sidewall of the trench 105 (See FIG. 10A) due to the error in the manufacturing process, an driving angle $\theta_1$ of the micromirror 125 is smaller than 90°. Alternatively, the second torsion bars 123 are slanted to the inside of the sidewall of the trench 105 (See FIG. 11A), a driving angle $\theta_2$ of the micromirror 125 is greater than 90°. In this case, the plate 115 is actuated so that the micromirror 125 stands erect at an accurate angle of 90°.

Figure 10B:
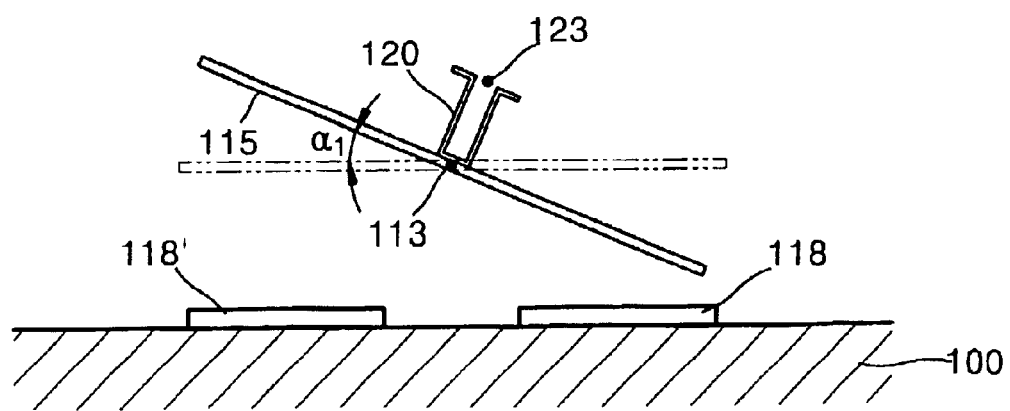

The plates 115 and 116 can be rotated by applying voltages to the first and second base electrodes 118 and 118'. For example, in the case where the second torsion bars 123 are slanted to the outside of the sidewall of the trench 105, as shown in FIG. 10B, the plate 115 is rotated clockwise by applying a voltage to the first base electrode 118. When the plate 115 is rotated clockwise by a predetermined angle of $\alpha_1$, the micromirror 125, which is supported by the second post 120 coupled on the plate 115, moves with the plate 115. Thus, the second torsion bars 123, which are the rotation shaft of the micromirror 125, are moved clockwise and corrected to be positioned on the plane on which extends the sidewall of the trench 105.

Figure 11A:
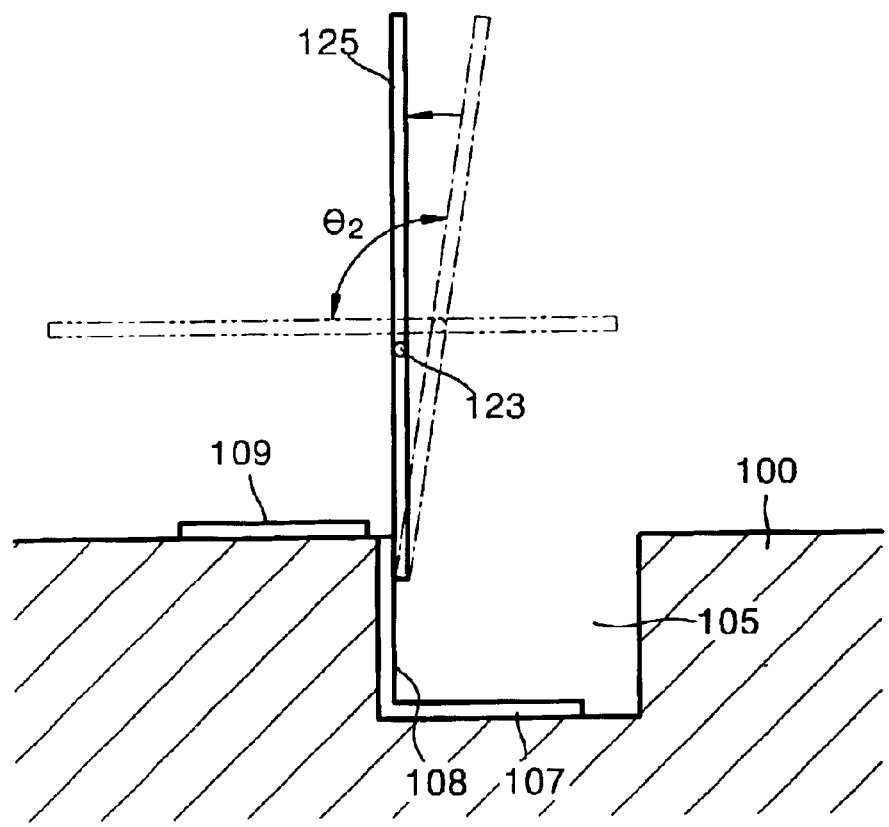
Figure 11B:
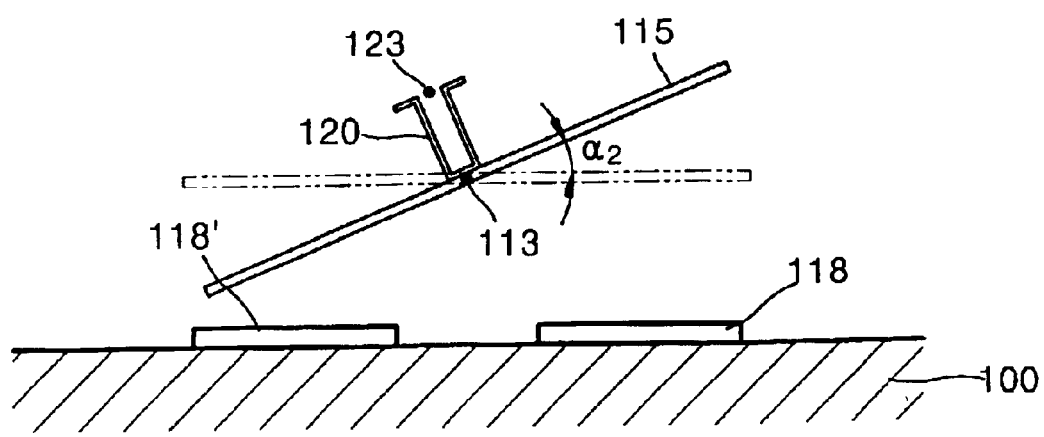

In contrast to this, as shown in FIG. 11A, in the case where the second torsion bars 123 are slanted to the inside of the sidewall of the trench 105, a voltage is applied to the second base electrode 118'. Here, as shown in FIG. 11B, the plate 115 rotates counterclockwise by a predetermined angle of $\alpha_2$. As a result, the second torsion bars 123 are moved in an opposite direction by an angle where the second torsion bars 123 are slanted with respect to the sidewall of the trench 105 so as to be positioned on the plane which extends the sidewall of the trench 105.

Accordingly, the micromirror actuator according to the present invention can precisely control a driving angle of the micromirror 125 to stand the micromirror 125 at an accurate right angle so as to minimize insertion loss.

A method of manufacturing the micromirror actuator according to the present invention will be described.

Steps of manufacturing the micromirror actuator according to the present are illustrated with respect to each of cross-sectional views taken along lines 6—6, 7—7, and 8—8 of FIG. 5.

Figure 12A:
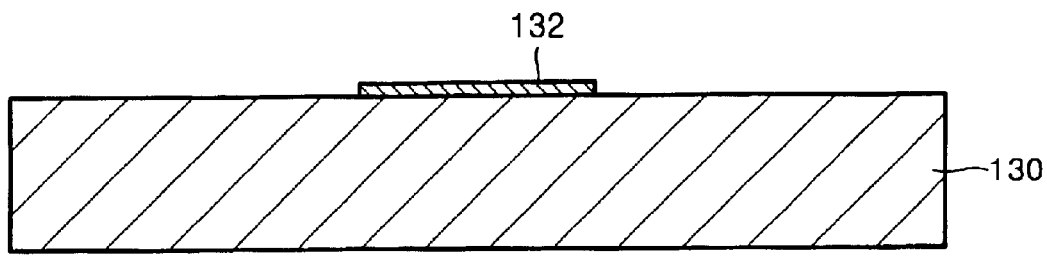
FIGS. 12A through 12G are cross-sectional views explaining steps of manufacturing the micromirror actuator according to the present invention, taken along line 6—6 of FIG. 5.
Figure 12B:
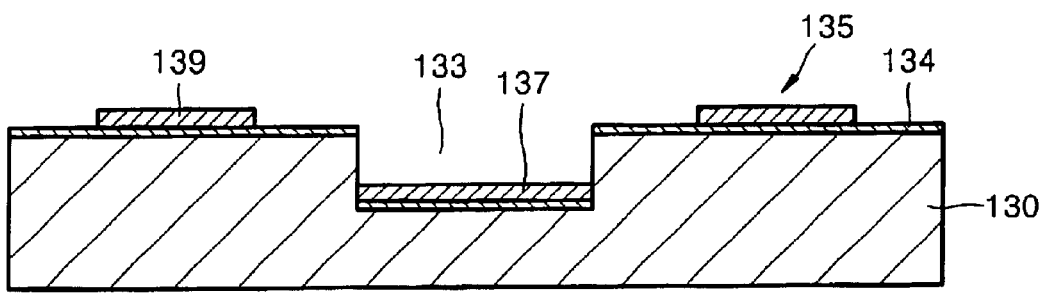
Figure 13A:
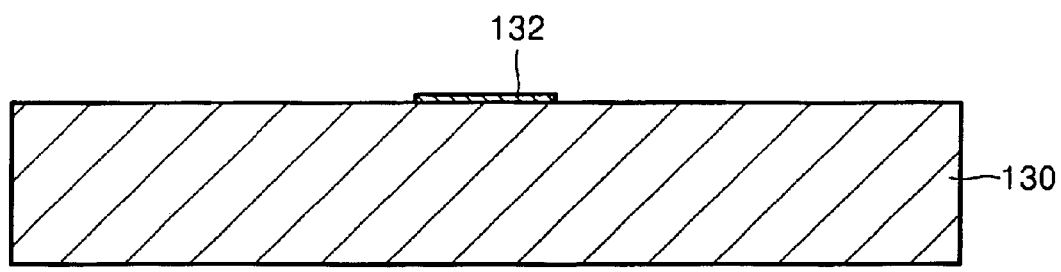
FIGS. 13A through 13F are cross-sectional views explaining steps of manufacturing the micromirror actuator according to the present invention, taken along line 7—7 of FIG. 5.
Figure 13B:
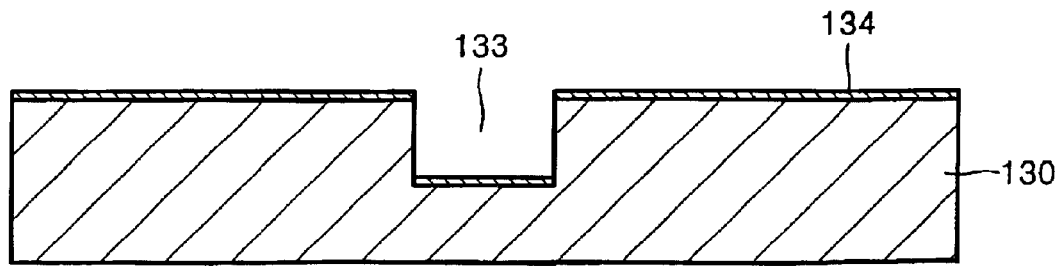
Figure 14A:
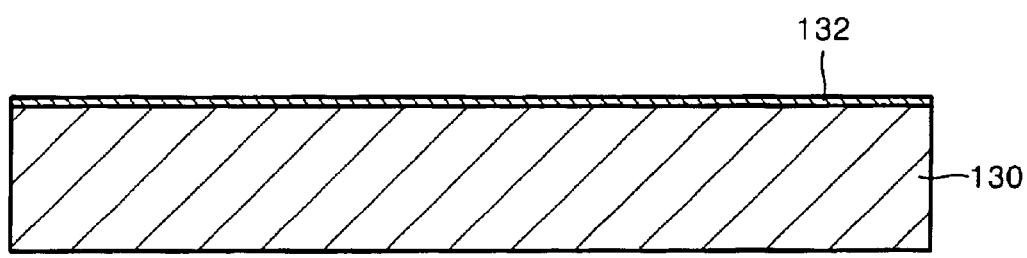
FIGS. 14A through 14F are cross-sectional views explaining steps of manufacturing the micromirror actuator according to the present invention, taken along line 8—8 of FIG. 5.
Figure 14B:
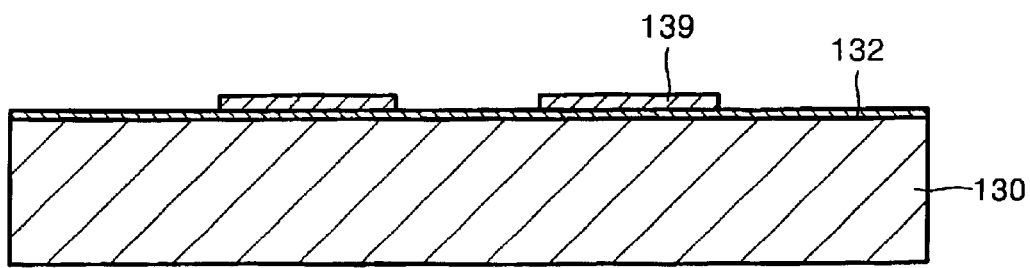

Referring to FIGS. 12A, 13A, and 14A, a wafer 130 is coated with photoresist 132. Next, a region where a trench will be formed is patterned by photolithorgraphy. The wafer 130 has crystalline orientation <110>, but does not necessary have to be <110>. To form a trench 133, the wafer 130 is wet etched if the crystalline orientation is <110> while is dry etched by deep Reactive Ion Etching. (RIE) if the crystalline orientation is not <110> (See FIGS. 12B and 13B). Thereafter, a dielectric layer 134 is deposited by a general deposition method. A first metal layer 135 is deposited on the dielectric layer 134. A lower electrode 137 and a side electrode 138 are formed at the bottom and sidewall of the trench 133 using photolithography and an etching process. A shielding electrode 136 is formed outside the trench 133. A base electrode 139 is formed on a predetermined position of the dielectric layer 134.

Figure 12C:
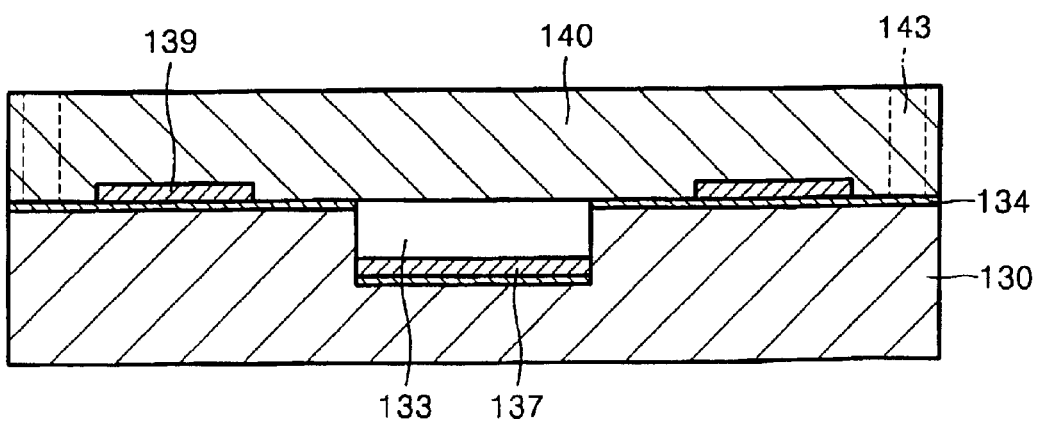
Figure 12D:
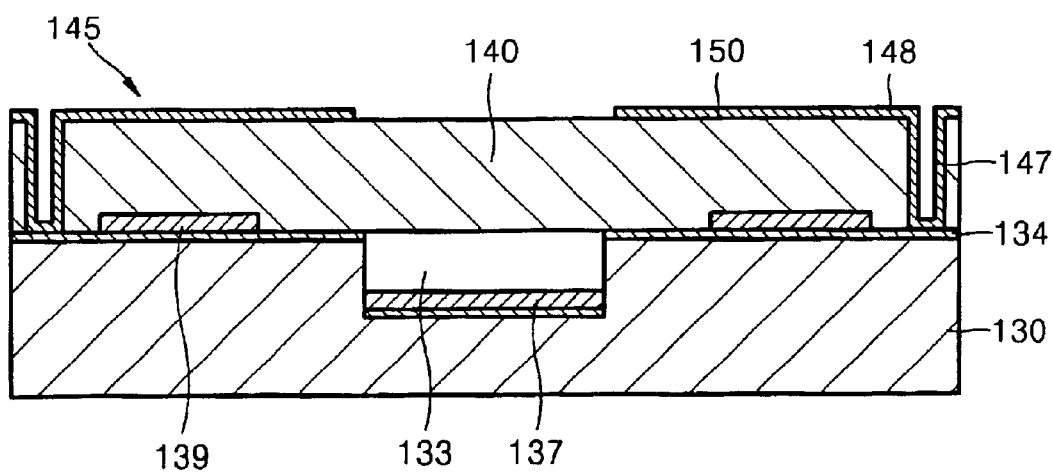
Figure 12E:
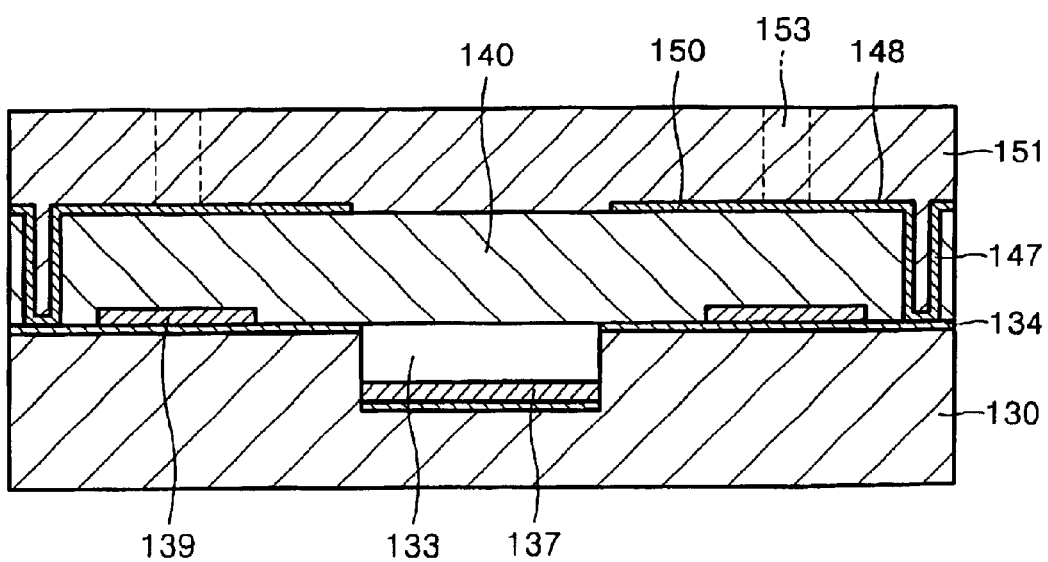
Figure 13C:
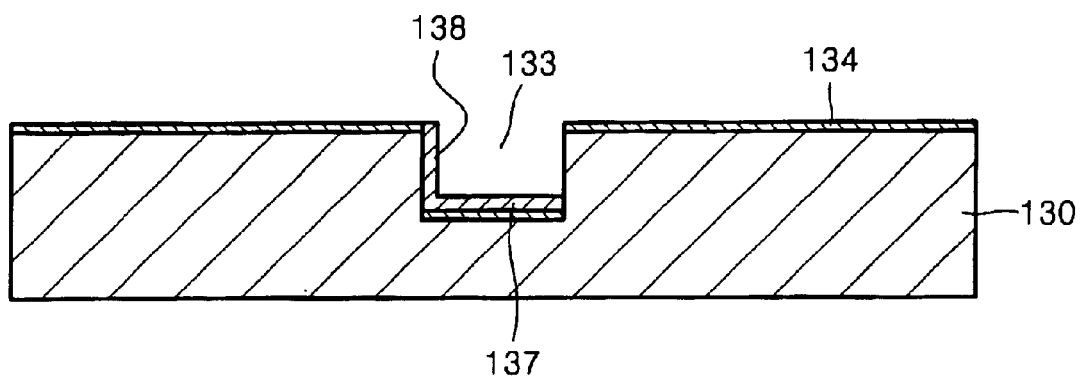
Figure 13D:
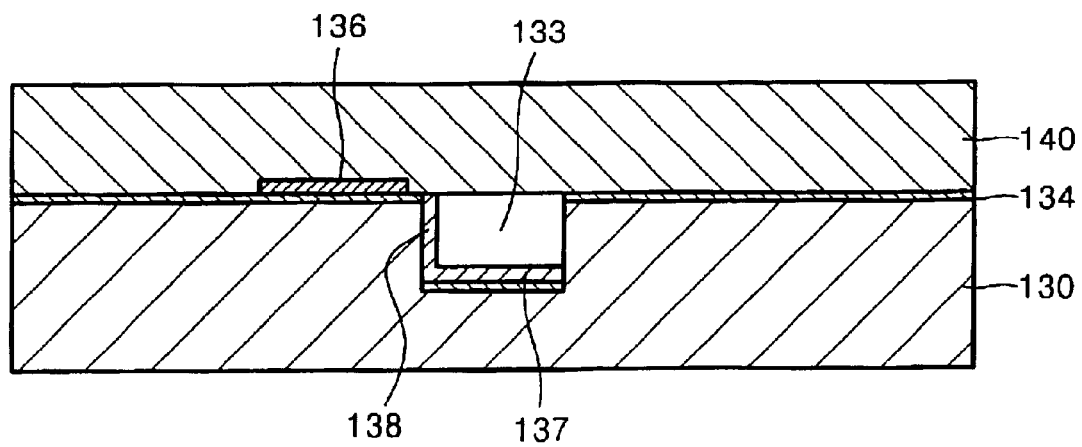
Figure 14C:
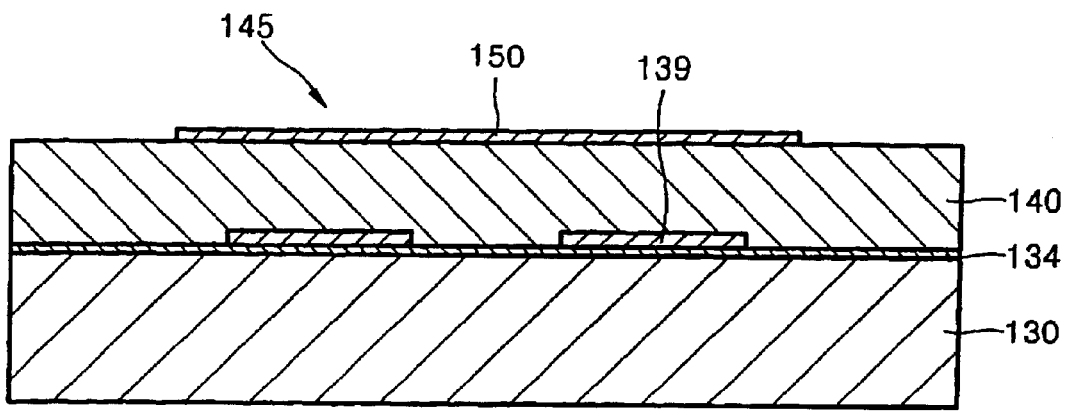
Figure 14D:
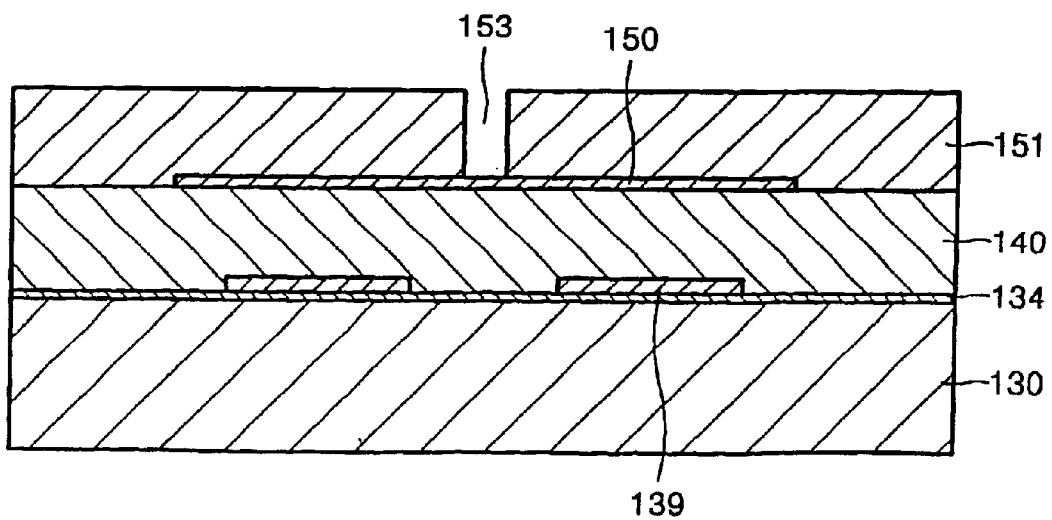

A dielectric layer (not shown) is deposited on the resultant structure. As shown in FIGS. 12C, 13C, and 14C, a film-type organic layer 140 is stacked on the resultant structure and laminated by applying heat and pressure. Here, since the organic layer 140 has a film type, the trench 133 remains hollow, and the organic layer 140 may be planarized. Holes 143 for the first posts are patterned in the organic layer 140 by photolithography. The holes 143 are formed by RIE. A second metal layer 145 is deposited on the resultant structure. First posts 147, first torsion bars 148, and plates 150 are formed using photolithograph and an etching process. Here, the plates 150 may separately be formed on two portions beside both sidewalls of the trench 133 or may have a single body. Photoresist 151 is coated, and then as shown in FIG. 14D, a hole 153 for the second post is formed using an etching process.

Figure 12F:
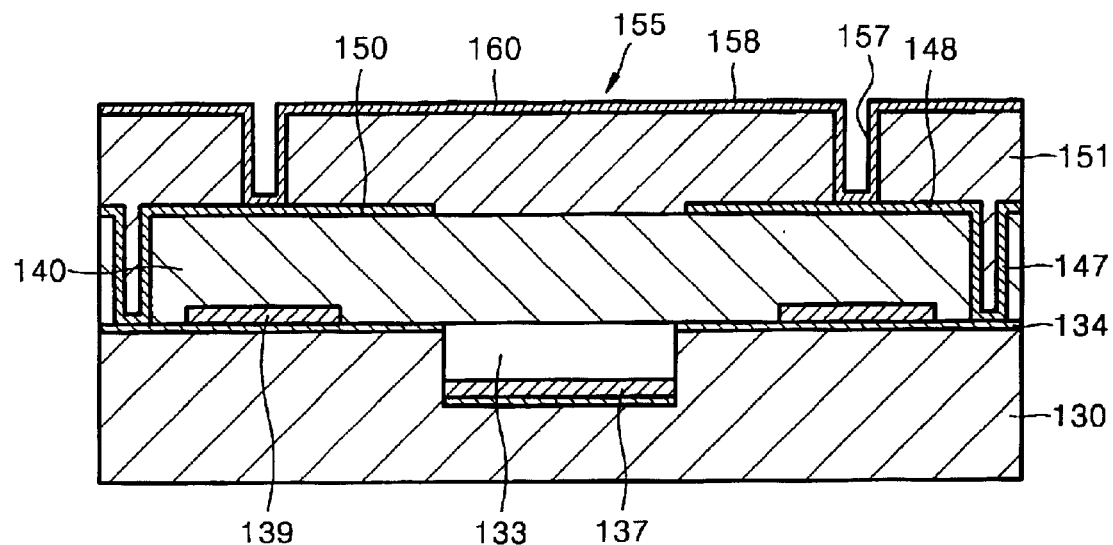
Figure 12G:
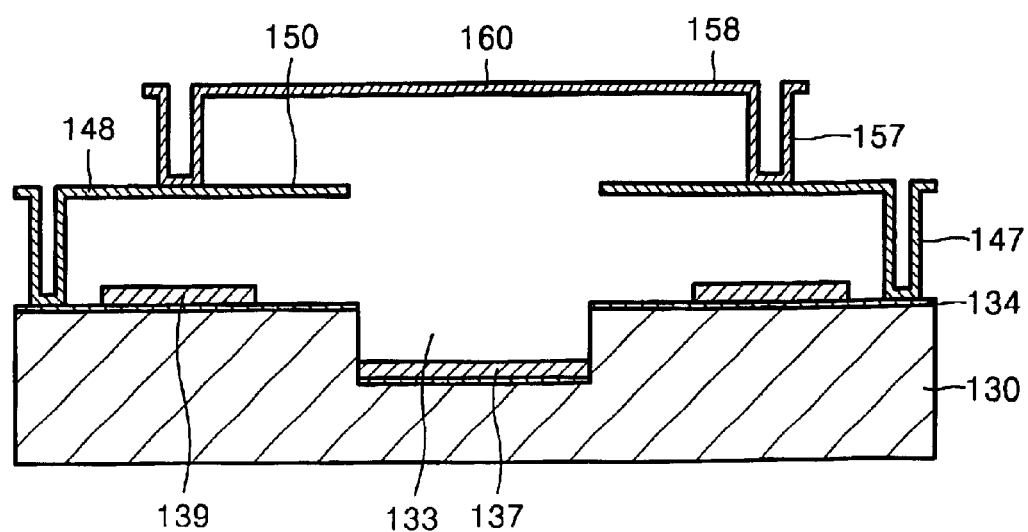
Figure 13E:
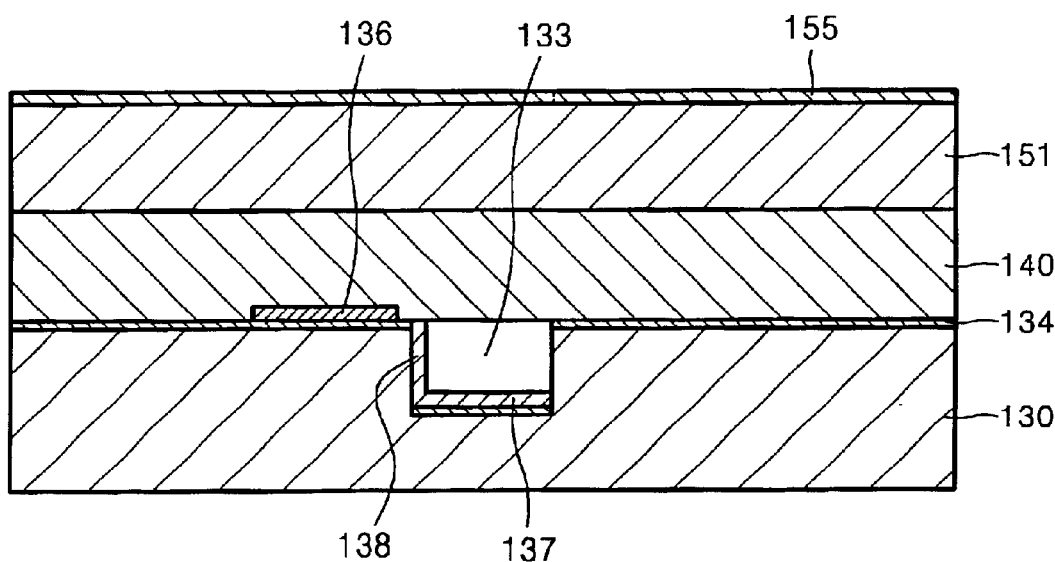
Figure 13F:
Figure 13F:
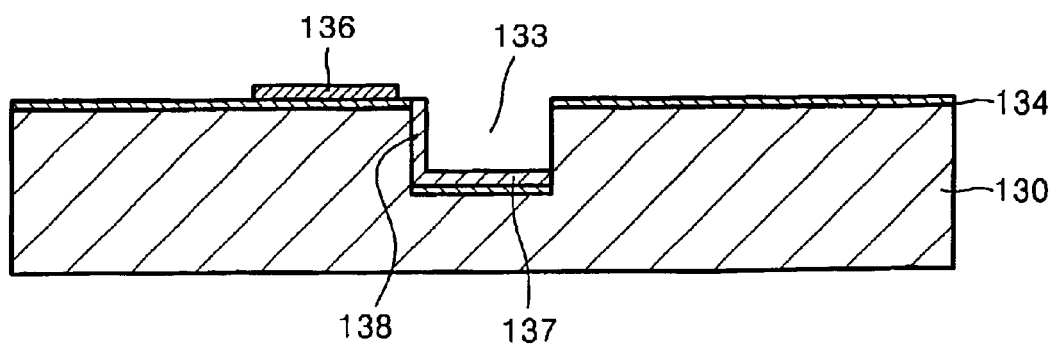
Figure 14E:
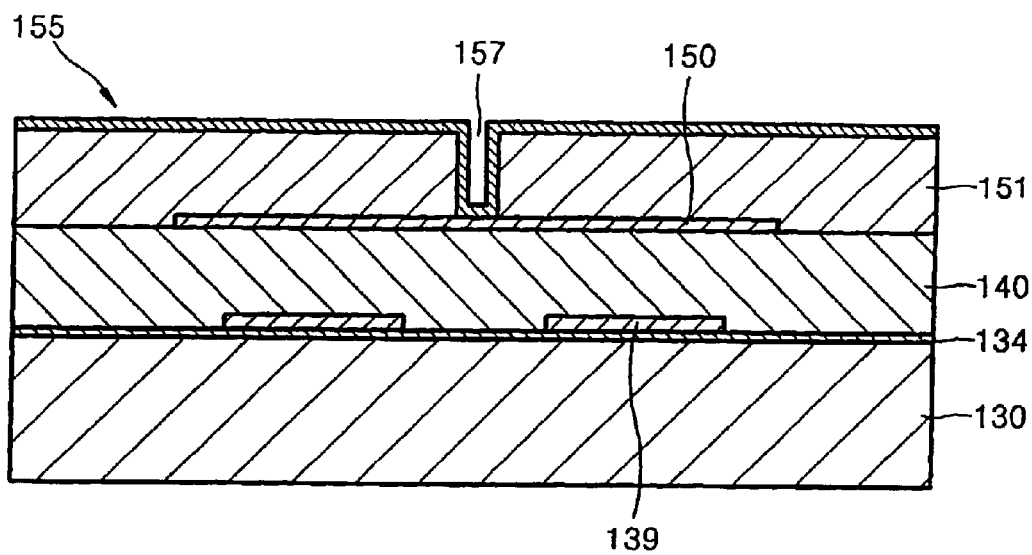
Figure 14F:
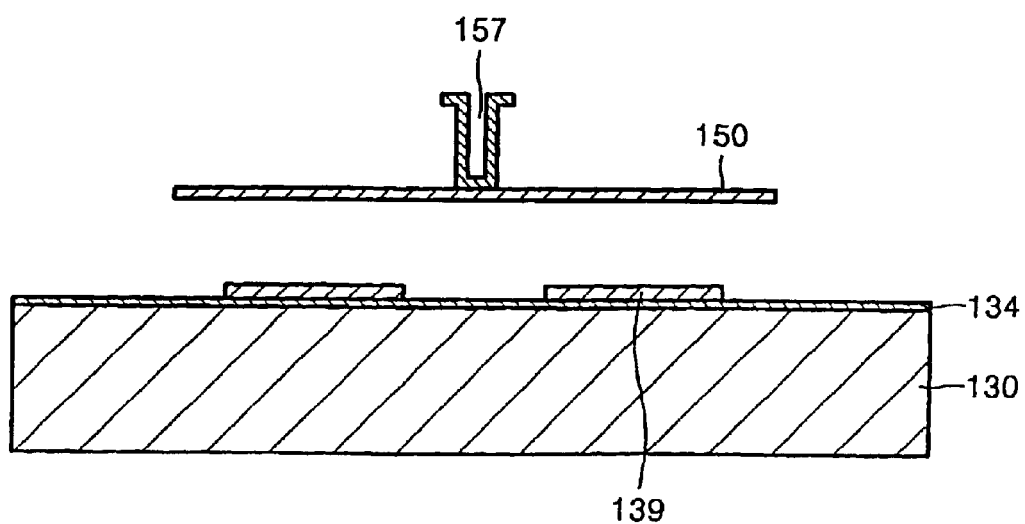

As shown in FIGS. 12F, 13E, and 14E, a third metal layer 155 is deposited on the resultant structure. Second posts 157, a second torsion bar 158, and a micromirror 160 are formed using photolithograph and an etching process. Finally, the organic layer 140 and the photoresist 151 are removed by an isotropic etching process to complete the micromirror actuator (See FIGS. 12G, 13F, and 14F).

In a micromirror actuator according to the present invention and a manufacturing method thereof, an driving angle of a micromirror can be actively and precisely be controlled when the micromirror does not stand erect at an accurate right angle due to an error in a manufacturing process. In other words, the micromirror can stand erect at the accurate right angle without an additional actuator for correcting the error in the actuation angle of the micromirror so as to reduce insertion loss. Also, a unit for controlling the driving angle of the micromirror can be manufactured by adding a unit process to an existing process of manufacturing the micromirror actuator.

What is claimed is:

1. A micromirror actuator comprising:

a substrate;

a trench which is formed in a predetermined position of the substrate and has at least one electrode;

a micromirror which rotates by an electrostatic force generated through an interaction with the at least one electrode so as to reflect incident light in a predetermined direction; and a driving angle control unit which supports the micromirror so as to control the position of an actuation shaft of the micromirror.

2. The micromirror actuator of claim 1, wherein the driving angle control unit comprises:

first posts which stand erect over two portions of the surface of the substrate beside sidewalls of the trench;

plates which are rotatably supported by first torsion bars that are coupled to the first posts, respectively; and a pair of base electrodes which are prepared on the substrate so as to face the plates when the plates are parallel with a surface of the substrate.

3. The micromirror actuator of claim 2, wherein the micromirror is rotatably supported by second torsion bars which are coupled to second posts fixed to the plates.

4. The micromirror actuator of claim 3, wherein the plates are disposed in a different plane from the micromirror.

5. The micromirror actuator of claim 4, wherein the plates are placed on two portions of the surface of the substrate beside the trench.

6. The micromirror actuator of claim 5, wherein the plates are supported by the first posts in the form of cantilevers.

7. The micromirror actuator of claim 4, wherein the plates form a single body so as to cross under the micromirror.

8. The micromirror actuator of claim 7, wherein the single body has a recessed portion so as not to contact the micromirror when the micromirror rotates.

9. The micromirror actuator of claim 8, wherein the at least one electrode comprises lower and side electrodes which are installed at a bottom and sidewall of the trench, respectively.

10. The micromirror actuator of claim 9, further comprising a shielding electrode for shielding an electrostatic force from being generated over the substrate that faces the micromirror when the micromirror is parallel with the surface of the substrate.

11. The micromirror actuator of claim 2, wherein the plates are disposed in a different plane from the micromirror.

12. The micromirror actuator of claim 11, wherein the plates are placed on two portions of the surface of the substrate beside the trench.

13. The micromirror actuator of claim 12, wherein first ends of the plates are supported by the first posts in the form of cantilevers.

14. The micromirror actuator of claim 13, wherein the at least one electrode comprises lower and side electrodes which are installed at a bottom and sidewall of the trench, respectively.

15. The micromirror actuator of claim 14, further comprising a shielding electrode for shielding an electrostatic force from being generated over the substrate that faces the micromirror when the micromirror is parallel with the surface of the substrate.

16. The micromirror actuator of claim 1, wherein the at least one electrode comprises lower and side electrodes which are installed at the bottom and sidewall of the trench, respectively.

* * * * *